United States Patent
Henkel et al.

(10) Patent No.: US 11,427,227 B2
(45) Date of Patent: Aug. 30, 2022

(54) SAFETY DEVICE FOR USE IN A VEHICLE, VEHICLE, AND METHOD FOR OPERATING A VEHICLE

(71) Applicant: Robert Bosch GmbH, Stuttgart (DE)

(72) Inventors: Achim Henkel, Stuttgart (DE); Andreas Hoertling, Leingarten (DE); Guido Funcke, Besigheim-Ottmarsheim (DE); Hartmut Loos, Hildesheim (DE); Werner Poechmueller, Sibbesse (DE)

(73) Assignee: Robert Bosch GmbH, Stuttgart (DE)

( * ) Notice: Subject to any disclaimer, the term of this patent is extended or adjusted under 35 U.S.C. 154(b) by 326 days.

(21) Appl. No.: 16/748,976

(22) Filed: Jan. 22, 2020

(65) Prior Publication Data

US 2020/0239028 A1   Jul. 30, 2020

(30) Foreign Application Priority Data

Jan. 25, 2019 (DE) .......................... 102019200942.5

(51) Int. Cl.
| | |
|---|---|
| *B60W 60/00* | (2020.01) |
| *B60W 50/14* | (2020.01) |
| *B60W 50/04* | (2006.01) |
| *G07C 5/06* | (2006.01) |
| *G05D 1/00* | (2006.01) |

(52) U.S. Cl.
CPC ...... *B60W 60/0054* (2020.02); *B60W 50/045* (2013.01); *B60W 50/14* (2013.01); *G05D 1/0061* (2013.01); *G05D 1/0088* (2013.01); *G07C 5/06* (2013.01)

(58) Field of Classification Search
None
See application file for complete search history.

(56) References Cited

U.S. PATENT DOCUMENTS

| | | | |
|---|---|---|---|
| 10,814,912 B2 * | 10/2020 | Cotter | B60R 1/00 |
| 2011/0229164 A1 * | 9/2011 | Watahiki | H02P 29/0241 |
| | | | 399/36 |
| 2017/0232975 A1 * | 8/2017 | Burk | B60W 50/14 |
| | | | 701/48 |
| 2019/0283770 A1 * | 9/2019 | Kubota | B60W 50/082 |
| 2020/0198656 A1 * | 6/2020 | Henkel | B60Q 9/00 |

FOREIGN PATENT DOCUMENTS

| | | |
|---|---|---|
| CN | 209560310 U * | 10/2019 |
| DE | 102016003359 A1 | 9/2017 |

\* cited by examiner

*Primary Examiner* — Abdhesh K Jha
(74) *Attorney, Agent, or Firm* — Norton Rose Fulbright US LLP; Gerard Messina

(57) ABSTRACT

A safety device for use in a vehicle which is configured to be operated at least intermittently in an automated driving mode, in which the vehicle drives in an automated manner, and which includes a first data source which is designed as a human machine interface and configured to output data about a driving status, including computing device and a first data interface, the safety device being configured to receive data about the driving status from the first data source via the first data interface, the safety device being configured to receive data about the driving status from a second data source different from the first data source, and the safety device being configured to output pieces of information about the driving status to a driver, using an information output device and based on the data received from the first data source and the second data source.

20 Claims, 2 Drawing Sheets

SAFETY DEVICE FOR USE IN A VEHICLE, VEHICLE, AND METHOD FOR OPERATING A VEHICLE

CROSS REFERENCE

The present application claims the benefit under 35 U.S.C. § 119 of German Patent Application No. DE 102019200942.5 filed on Jan. 25, 2019, which is expressly incorporated herein by reference in its entirety.

FIELD

The present invention relates to a safety device for use in a vehicle including an automated driving mode, to a vehicle including such a safety device, and to a method for operating a vehicle.

BACKGROUND INFORMATION

Contemporary driver assistance systems in vehicles are typically not designed for taking over safety-relevant driving functions. With these assistance functions, the driver thus always remains responsible as the vehicle driver, even if modern assistance functions assist with the transverse and longitudinal guidance.

With future automation functions such as the so-called "traffic jam pilot," present approaches are reaching their limits since in such cases the vehicle is to assume responsibility at least intermittently, and the driver is able to turn to other tasks during this time. In this connection, this may also be referred to as an automated driving mode in which the vehicle drives in an automated manner.

German Patent Application No. DE 10 2016 003 359 A1 describes, for example, use of two control units in a vehicle including an automated driving mode, among other things, which meet different safety criteria. The control unit having the higher safety criterion visually displays the presence of an active automated driving mode, and the control unit having the lower safety criterion activates a display.

SUMMARY

According to the present invention, a safety device for use in a vehicle, a vehicle and a method for operating a vehicle having are provided. Advantageous example embodiments of the present invention are described herein.

An example safety device according to the present invention is used in a vehicle or is provided and configured therefor. A particularly suitable vehicle is configured to be operated at least intermittently in an automated driving mode in which the vehicle is driving in an automated manner. In particular, the term "automated driving mode" shall thus be understood to mean that the vehicle—at least intermittently or under certain conditions—drives or is able to drive on a road without the intervention of a human driver. However, the vehicle may be communicatively connected to a higher-level infrastructure. Moreover, a particularly suitable vehicle includes a first data source designed as a human machine interface, which is configured to output data about a driving status.

Such a human machine interface is, in particular, a unit with the aid of which pieces of information may be shared with a driver or another person in the vehicle. The human machine interface thus advantageously includes computing means and/or information output means. The first data source is thus preferably also configured to output pieces of information about the driving status to the driver. A flow of information in the opposite direction is also advantageous, i.e., that a person is able to transmit pieces of information about the human machine interface to the vehicle or a corresponding computing unit. A typical and preferred human machine interface within this meaning is a head-up display, a combination instrument (instrument cluster) or a head unit (operating unit of the so-called infotainment system), or also only illuminated touch screens, pushbuttons or switches, as they are typically used in modern vehicles.

The present invention makes it possible, in particular, to safeguard the transfer of responsibility from the vehicle back to the driver in a safety-relevant manner. In this connection, the vehicle is always able to correctly display or share the instantaneous driving mode, in particular, with respect to the automated/non-automated distinction, as information about the driving status. In particular, a display or information that the vehicle is not in the automated driving mode (any more) has to function reliably and must not erroneously indicate to a driver that the vehicle is driving in an automated manner.

In the case of vehicles which drive in an automated manner, it is particularly important that it is reliably displayed to the driver whether or not the vehicle is presently in the automated driving mode. Typically, certain safety levels are required for this purpose, i.e., for the display or sharing of information, which have a particularly low risk of failure. For example, an ASIL D level according to the ASIL (Automotive Safety Integrity Level) classification common in the automotive field is possible.

Contemporary driver assistance systems including a human machine interface are typically not designed for taking over safety-relevant driving functions, i.e., they do not meet the safety levels required for an automated driving mode. Rather, with such assistance functions, the driver of the vehicle always remains responsible as the vehicle driver.

The described safety device now includes computing means (e.g., a computer) and a first data interface and is configured to receive data about the driving status from the first data source, i.e., the human machine interface, via the first data interface. Moreover, the safety device is configured to receive data about the driving status from a second data source different from the first data source, and it is furthermore configured, using information output means (e.g., an output device) and based on the data received from the first data source and the second data source, to output pieces of information about the driving status to the driver, and in particular, when an error or a malfunction is identified on the human machine interface.

This safety device may, in particular, be a control unit or another computing unit which may be appropriately integrated into the vehicle via the first data interface. The safety device may be variably situated in the vehicle, which is possible, in particular, independently of the conventional human machine interface. This includes, e.g., installation sites in the center console, in particular, installation sites close to the driver in the center console, in the vicinity of the armrest or also in the roof area of the vehicle.

During operation, the described safety device receives data about the driving status from different data sources, which cover, in particular, the automated driving mode or data including the information as to whether or not the vehicle is in the automated driving mode. Whereas the first data source is the (primary) human machine interface, which normally is preferably also used to inform the driver about the driving status, the second data source may be another computing unit or a control unit of the vehicle, in particular, a driver assistance control unit (DAS, or ADAS—Advanced Driver Assistance System), such as speed control, adaptive cruise control, brake assistance systems, lane-keeping assistance systems and the like. For this purpose, the safety device includes a second data interface, the safety device being configured to receive data about the driving status from the second data source via the second data interface.

The data from the first and second data sources may (directly) transmit the status of the automated driving function or of the automated driving mode (e.g., "automated on," "automated off," "automated driving mode on in x sec," "automated driving mode off in x sec" and the like) or include data from which the information then still has to be derived.

In this way, two data sources are available to the safety device. In the event of an error or failure of the human machine interface, data from the second data source are always still present, and it is still possible to output the information about the driving status. The pieces of information about the driving status may be output by suitably connected information output means, which are present, for example, in the vehicle anyhow. However, it is particularly preferred when specific information output means intended for the safety device are used or provided.

The particular advantage of this safety device additionally usable in a vehicle is now that a conventional human machine interface—having a low safety level—may continue to be used, for example within the context of standard equipment for a vehicle. In contrast, the described safety device may then be used within the context of optional equipment, within the scope of which automated driving is enabled. In contrast, a second variant of the conventional human machine interface, for example of the head unit, or a human machine interface having a high safety level for all equipment variants, is not necessary. Rather, the safety-relevant functions are covered by the safety device. In particular, it may be provided that a decision-making function or "voter function" in the safety device decides on the correctness of the data received from the two data sources and in this way, for example, safeguards the human machine interface or is able to identify an error.

The safety device is preferably configured to receive data about the driving status from a second data source, which is supplied with energy separately from the first data source. In this way, it is ensured that data about the instantaneous driving status are still transmitted to the safety device even in the event of a failure of the energy supply of the first data source, i.e., the human machine interface, and, if necessary depending on an energy supply of the safety device, in particular, may also be output reliably and correctly. Energy supply source for this purpose may, in particular, be different vehicle electrical system channels which are decoupled from one another by appropriate precautions in such a way that, for example, a short circuit in one of the vehicle electrical system channels does not jeopardize the functional capability of the other vehicle electrical system channel. However, it is also possible that a separate energy storage unit, which, in particular, is independent of an electrical system of the vehicle, is or will be provided for the safety device. An emergency energy supply system is also possible, for example a battery or the like, which is only used when the remaining energy supply system fails.

The safety device is advantageously configured to deactivate the human machine interface when a malfunction is identified on the human machine interface. From a safety point of view, the human machine interface may thus be considered to be a slave (and the safety device a master), in particular, also when the safety device has a higher safety level than the human machine interface. In this way, the safety device may be safeguarded even better. A malfunction may, in particular, be identified by the aforementioned "voter function" or when data are no longer received from the human machine interface.

The safety device preferably includes information output means via which the pieces of information about the driving status are outputtable. As an alternative or in addition, however, it is also preferred when the safety device includes an interface to information output means via which data and/or signals and/or a power supply for the information output means are providable. Whereas a compact unit covering all functions is obtained for the integrated information output means, the interface enables a targeted positioning of the information output means in the vehicle. Both variants of the information output means may be such that they are configured to output visual and/or acoustic pieces of information. These include, in particular, a display, one or multiple LED(s) or other lamp(s), a speaker or an actuator for warning sounds. In particular, in the case of a display or a speaker, it is also possible to output words or sentences which, for example as a function of the situation, inform the driver, in particular, not only about the driving status, but if necessary also include other pieces of information. It is also possible to output more in-depth, in particular, safety-relevant pieces of information.

It is advantageous when the safety device is configured to identify a malfunction of the information output means. If the safety device includes an interface to information output means, it is also advantageous when the safety device is configured to identify a malfunction of this interface. In other words, a diagnosis of the host or the connected or used information output means and/or of the interface may thus be carried out, which increases the safety overall.

It is also preferred when the safety device is configured to identify a host malfunction and, in particular, also to display it, using information output means. Such an option of self-diagnosis also increases the safety.

The present invention furthermore relates to a vehicle which is configured to be operated at least intermittently in an automated driving mode in which the vehicle drives in an automated manner, includes a first data source designed as a human machine interface which is configured to output data about a driving status, includes a second data source which is different from the first data source and configured to output data about the driving status, and includes a safety device according to the present invention.

The safety device and the first data source or the human machine interface are, in particular, supplied with energy by different energy supply sources. The different energy supply sources are, in particular, part of different vehicle electrical system channels. However, it is also possible that the energy supply source for the safety device is designed as a separate energy storage unit, which, in particular, is independent of an electrical system of the vehicle.

As an alternative or in addition, the second data source and the first data source are preferably supplied with energy by different energy supply sources. As an alternative or in addition, the safety device and the second data source are preferably supplied by the same energy supply source. In particular, two or three different energy supply sources may thus be provided for the first data source, the second data source and the safety device.

The present invention furthermore relates to a method for operating a vehicle which is configured to be operated at least intermittently in an automated driving mode, in which the vehicle drives in an automated manner, and which includes a first data source which is designed as a human machine interface and configured to output data about a driving status. Moreover, it also includes a second data source which is different from the first data source and configured to output data about the driving status. Data about the driving status originating from the first data source and data about the driving status originating from the second data source are received, and, using information output means, pieces of information are output based on the data about the driving status received from the first data source and the second data source. For this purpose, in particular, a safety device according to the present invention may be used in the vehicle or a vehicle according to the present invention may be used.

With respect to the advantages and further preferred embodiments of the vehicle and of the method, reference shall be made to above statements on the safety device, which apply correspondingly here, to avoid repetition.

In addition, the implementation of a method according to the present invention in the form of a computer program or a computer program product having program code for carrying out all method steps is advantageous since this results in particularly low costs, in particular when an executing control unit is also used for additional tasks and is therefore present anyhow. Suitable data carriers for providing the computer program are, in particular, magnetic, optical and electrical memories, such as hard disks, flash memories, EEPROMs, DVDs, and the like. It is also possible to download a program via computer networks (Internet, Intranet, and the like).

Further advantages and embodiments of the present invention are derived from the description and the accompanying drawings.

The present invention is schematically shown based on exemplary embodiments in the figures and is described hereafter with reference to the figures.

DETAILED DESCRIPTION OF EXAMPLE EMBODIMENTS

Figure 1:
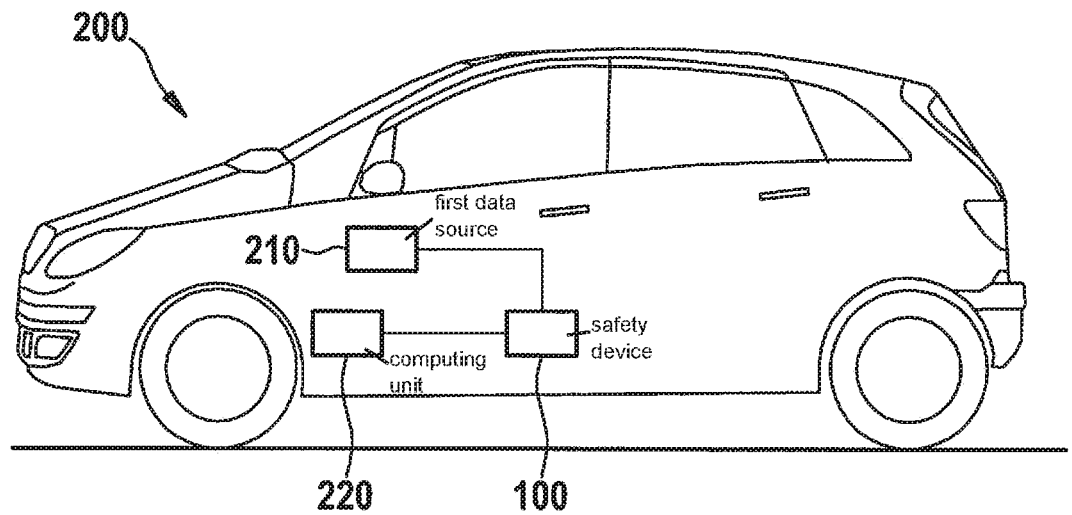
FIG. 1 schematically shows a vehicle according to the present invention in one preferred specific embodiment.

FIG. 1 schematically shows a vehicle 200 according to the present invention, with the aid of which a method according to the present invention may also be carried out, in a preferred specific embodiment.

Vehicle 200 includes a first data source 210 designed as a human machine interface including information output means. This may be a head unit or a combination instrument, for example, which is also usable and configured for driver assistance functions. Human machine interface 210 is configured to output data about a driving status via a corresponding data interface, e.g., a CAN interface. The data may be transmitted to human machine interface 210 from driver assistance control units, for example.

Moreover, human machine interface 210 is configured to output pieces of information about the driving status to the driver via the information output means. In particular, the information as to whether or not vehicle 200 is in an automated driving mode may be output. Such an output of pieces of information may take place visually and/or acoustically.

Furthermore, vehicle 200 includes a computing unit 220 as a second data source, which is also able to output data about the driving status via a corresponding data interface, e.g., a CAN interface. For this purpose, computing unit 220 may, for example, generate these data itself and/or obtain them from driver assistance control units. Computing unit 220 may, for example, be an ESP control unit or another control unit, in particular, for safety-relevant or safety-critical functions and/or applications, or a driver assistance control unit.

Moreover, a safety device 100 is provided, which is connected both to human machine interface 210 and to computing unit 220. Safety device 100 is a safety device according to the present invention in a preferred specific embodiment, as it is described hereafter in greater detail—together with the specific connection to human machine interface 210 and computing unit 220.

Figure 2:
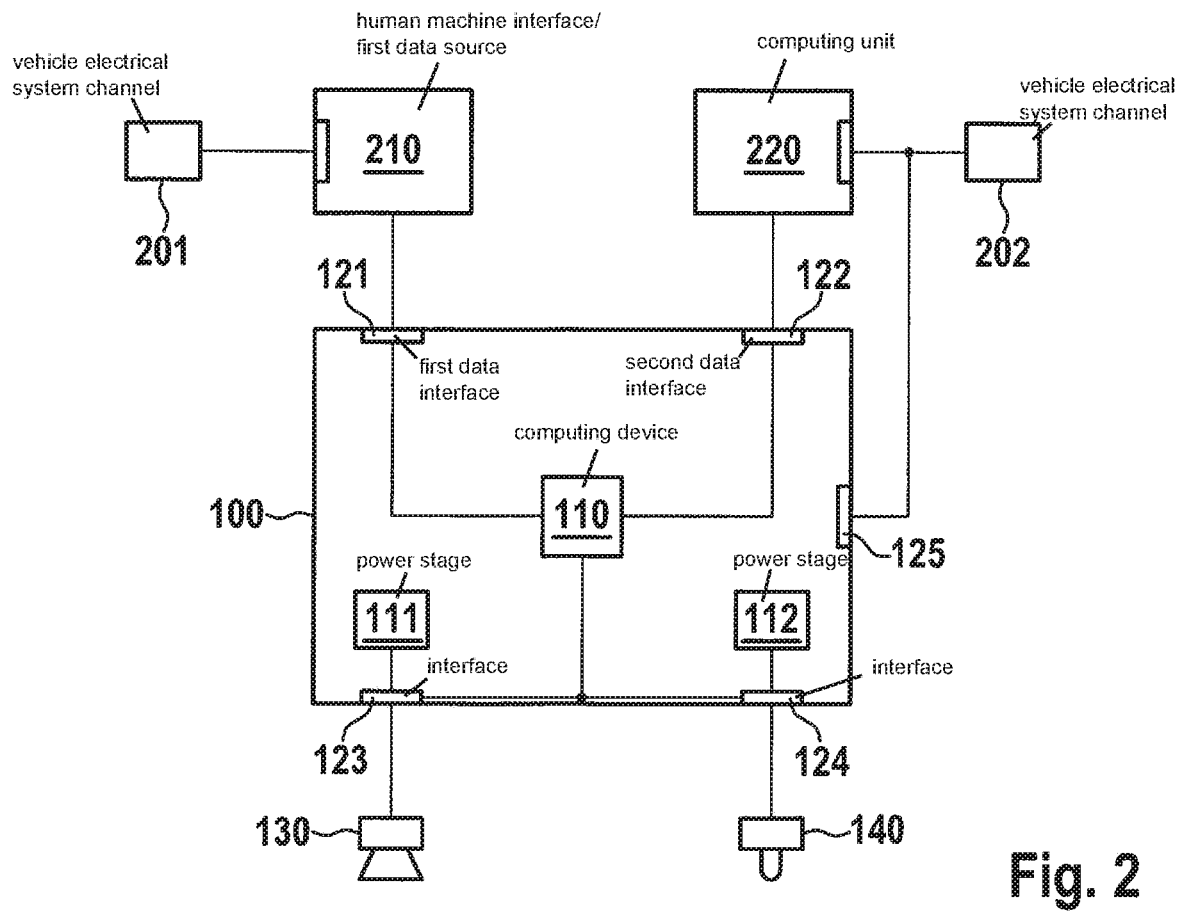
FIG. 2 schematically shows a safety device according to the present invention in one preferred specific embodiment.

FIG. 2 schematically shows a safety device 100 according to the present invention in a preferred specific embodiment, as it may be used in vehicle 200 according to FIG. 1, for example.

Safety device 100 includes computing means 110 and a first data interface 121 and a second data interface 122. First data source or human machine interface 210 already shown in FIG. 1 is connected via first data interface 121 in a data-transmitting manner to safety device 100 or its computing means 110, for example via a CAN, MOST, LIN or Flexray bus or also Ethernet. Computing unit 220 also already shown in FIG. 1, which within the meaning of the present invention represents a second data source, is connected via second data interface 122 in a data-transmitting manner to safety device 100 or its computing means 110, for example via a CAN, MOST, LIN or Flexray bus or also Ethernet.

In this way, safety device 100 is able to receive data about an instantaneous driving status from two different data sources and is able, in particular, to derive therefrom, as information about the driving status, whether or not vehicle 200 is in an automated driving mode. These data may in each case directly include the information about the status of the automated driving function or of the automated driving mode (e.g., "automated on," "automated off," "automated driving mode on in x sec," "automated driving mode off in x sec" and the like) or be used to first ascertain the information.

Furthermore, two different vehicle electrical system channels 201 and 202 of an electrical system of vehicle 200 are shown by way of example, which allow and also ensure an energy supply which is separate and, in particular, independent of one another. While human machine interface 210 is coupled or connected to vehicle electrical system channel 201 and supplied with energy therefrom, computing unit 220 is coupled or connected to vehicle electrical system channel 202 and supplied with energy therefrom. This depicted way of energy supply is a typical way of energy supply for a combination instrument as human machine interface 210 and an ESP control unit as computing unit 220, for example. In connection with the present invention, however, it is thus also ensured that the safety device may continue to receive data about the driving status, even in the event of a failure of the vehicle electrical system channel 201. Within this meaning, the second data interface 122 also serves as a so-called "fail op data interface."

For this reason, safety device 100 itself is preferably also connected to vehicle electrical system channel 202, namely via interface 125, and is supplied with energy therefrom. However, it shall be understood that other, if necessary separate, further energy sources may also be used to supply safety device 100 with energy, for example a battery. This may take place both alternatively and additionally to vehicle electrical system channel 202.

Furthermore, safety device 100 is connected via an interface 123 to information output means 130, which are configured to output acoustic pieces of information. Information output means 130 may, for example, be a speaker or an acoustic signal transmitter for a warning sound or warning oscillating signal or the like.

Moreover, safety device 100 is connected via an interface 124 to information output means 140, which are configured to output visual pieces of information. Information output means 140 may, for example, be one or multiple LED(s), lamp(s), light strip(s), or also a display, or the like.

Both information output means 130 and information output means 140 are connected via interface 123 and/or 124 to computing means 110 so that data or signals for corresponding pieces of information are outputtable or displayable. Moreover, both information output means 130 and information output means 140 are preferably supplied via interface 123 and/or 124 with power or energy, which takes place using drivers or power stages 111 and 112. Interfaces 123 and 124 are thus used both for the power supply and for the transmission of data or signals.

As a result of the integration of the drivers or power stages into safety device 100, the information output means may be positioned with little installation space requirement in a targeted manner or as desired in the vehicle, to be able to optimally display the pieces of information about the driving status or, if necessary, also further pieces of information to the driver.

It shall be understood that information output means 130 and 140 shown here are only selected by way of example. The number and type of the information output means may be selected as a function of desire or situation. For example, only acoustic or only visual information output means are also possible.

Safety device 100 is now configured to output information about the driving status to the driver with the aid of information output means 130 and 140. This may take place simultaneously and in parallel with an output by human machine interface 210, or only when it is established that human machine interface 210 has a malfunction, e.g., has failed, be it due to energy supply, hardware and/or software faults.

Figure 3:
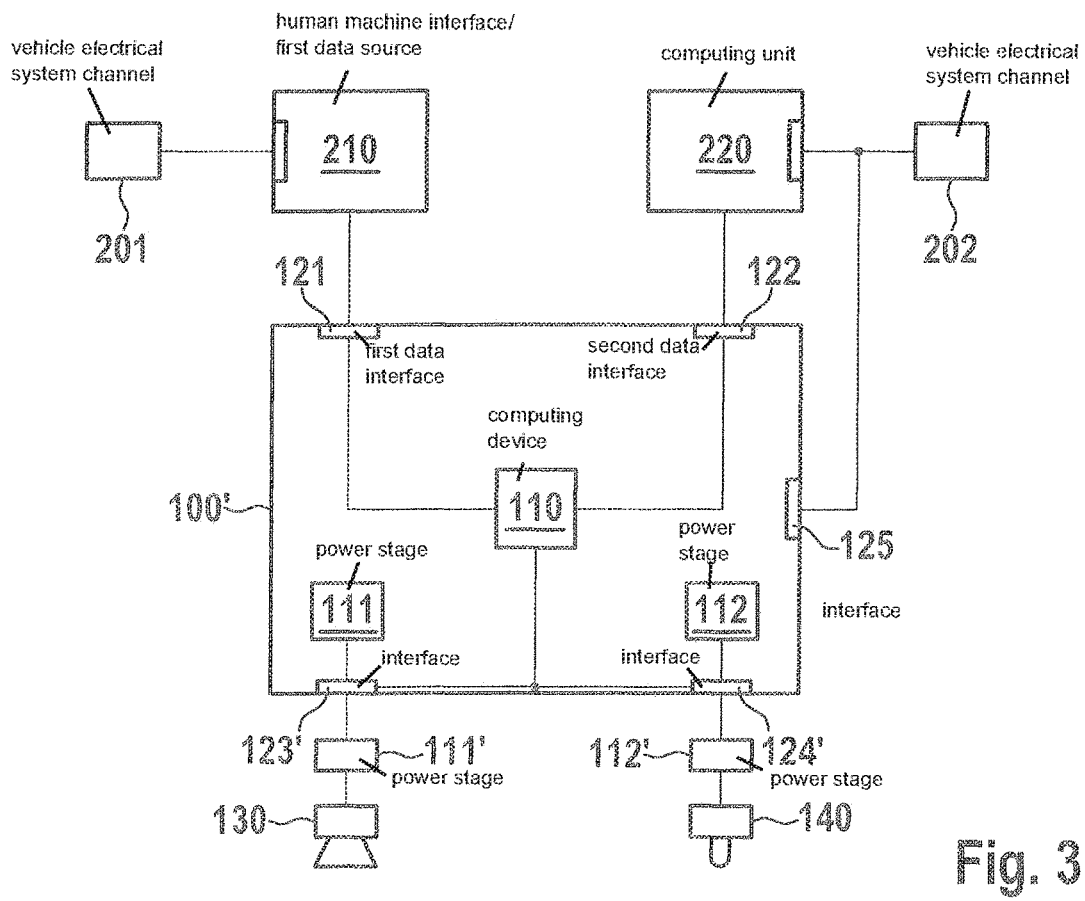
FIG. 3 schematically shows a safety device according to the present invention in one further preferred specific embodiment.

FIG. 3 schematically shows a safety device 100' according to the present invention in a further preferred specific embodiment, as it may also be used in vehicle 200 according to FIG. 1, for example.

Safety device 100' essentially corresponds to safety device 100 according to FIG. 2, however with the exception that drivers and power stages 111' and 112' here are not integrated into the safety device, but are situated outside, in particular, on the respective information output means 130 and 140, or in the vicinity thereof.

Interfaces 123 and 124 may accordingly be reduced to the transmission of data or signals, and a power supply for drivers and power stages 111' and 112' may take place separately from safety device 100', for example via a further vehicle electrical system channel or a separate energy supply source. It shall be understood that the energy supply used for the safety device may also be used for the drivers and power stages.

In this way, a safety device requiring less installation space may be provided. It is also possible that drivers and power stages and/or information output means already present in a vehicle are used, in particular, if they are designed for the safety requirements. Incidentally, reference shall be made to the description regarding FIG. 2, which applies accordingly here.

Figure 4:
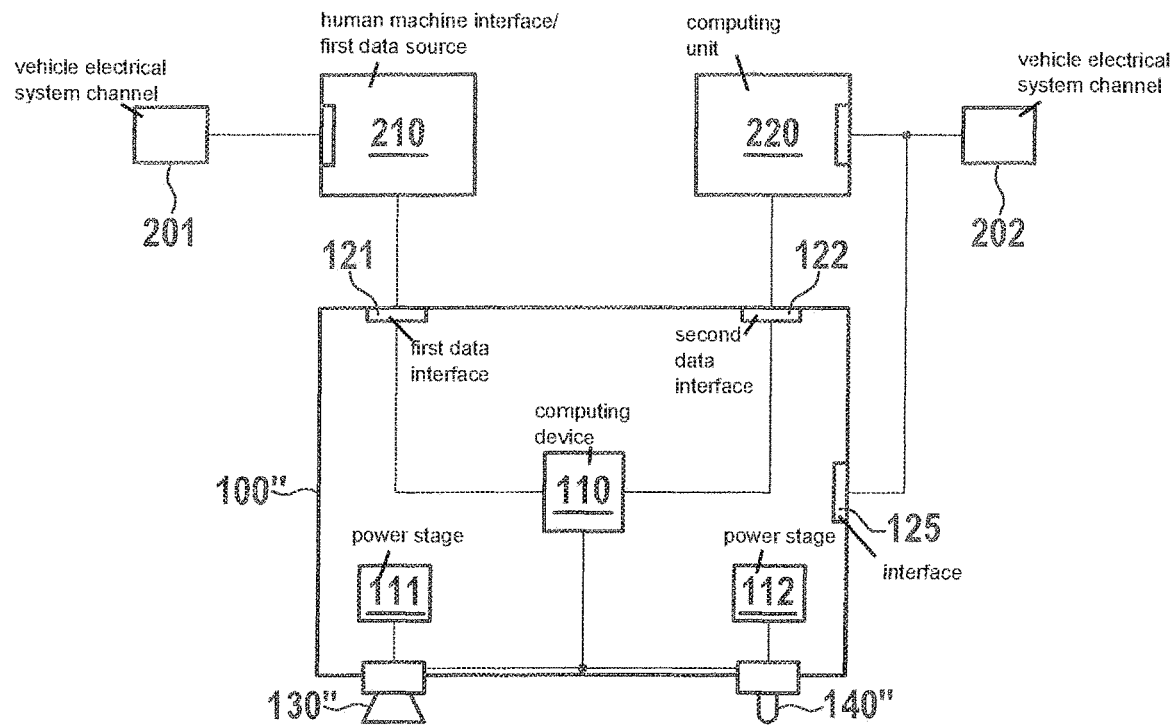
FIG. 4 schematically shows a safety device according to the present invention in one further preferred specific embodiment.

FIG. 4 schematically shows a safety device 100" according to the present invention in a further preferred specific embodiment, as it may also be used in vehicle 200 according to FIG. 1, for example.

Safety device 100" essentially corresponds to safety device 100 according to FIG. 2, however with the exception that not only drivers and power stages 111' and 112', but also the information output means, which are denoted by 130" and 140" here, are integrated into the safety device.

Accordingly, no external interfaces are necessary for a transmission of data and signals. In this way, a functional and compact safety device which is usable in a versatile manner may be provided. Incidentally, reference shall be made to the description regarding FIG. 2, which applies accordingly here.

What is claimed is:

1. A safety device for use in a vehicle which (a) is configured to be operated at least intermittently in an automated driving mode in which the vehicle drives in an automated manner, and (b) includes a first data source which is configured as a human machine interface that is configured to use a first information output device to output to a driver of the vehicle first data about a driving status indicating whether the driving status is that the vehicle is being driven in the automated manner, the safety device comprising:
   a computing device; and
   a first data interface;
   wherein the safety device is configured to:
      receive the first data about the driving status from the first data source via the first data interface;
      receive second data about the driving status from a second data source different from the first data source; and
      output pieces of information about the driving status to the driver using a second information output device and based on the first and second data received, received, from the first data source and the second data source.

2. The safety device as recited in claim 1, further comprising:
   a second data interface via which wherein the safety device is configured to receive the second data about the driving status from the second data source.

3. The safety device as recited in claim 1, wherein the safety device is configured to output the pieces of information about the driving status when a malfunction of the first data source is identified.

4. The safety device as recited in claim 3, wherein the safety device is configured to deactivate the first data source when a malfunction of the first data source is identified.

5. The safety device as recited in claim 1, wherein the second information output device is integrated in the safety device.

6. The safety device as recited in claim 1, further comprising:
an interface to the second information output device via which data and/or signals and/or a power supply for the second information output device are provided.

7. The safety device as recited in claim 1, wherein the safety device is configured to identify a malfunction of the second information output device.

8. The safety device as recited in claim 5, wherein the second information output device is configured to output visual and/or acoustic pieces of information.

9. The safety device as recited in claim 5, wherein the safety device is configured to identify a host malfunction and also display the host malfunction using the second information output device.

10. The safety device as recited in claim 1, wherein the safety device is configured to output the pieces of information about the driving status with the same or a higher safety level than the first data source.

11. A vehicle configured to be operated at least intermittently in an automated driving mode in which the vehicle (200) drives in an automated manner, the vehicle comprising:
a first data source configured as a human machine interface and configured to use a first information output device to output to a driver of the vehicle first data about a driving status indicating whether the driving status is that the vehicle is being driven in the automated manner;
a second data source which is different from the first data source and configured to output second data about the driving status; and
a safety device including a computing device and a first data interface, wherein the safety device is configured to:
receive the first data about the driving status from the first data source via the first data interface;
receive the second data about the driving status from the second data source; and
output pieces of information about the driving status to the driver using a second information output device and based on the first and second data received, respectively, from the first data source and the second data source.

12. The vehicle as recited in claim 11, wherein the safety device and the first data source are supplied with energy by different energy supply sources.

13. The vehicle as recited in claim 12, wherein the different energy supply sources are parts of different vehicle electrical system channels.

14. A vehicle configured to be operated at least intermittently in an automated driving mode in which the vehicle drives in an automated manner, the vehicle comprising:
a first data source configured as a human machine interface and configured to output first data about a driving status;
a second data source which is different from the first data source and configured to output second data about the driving status; and
a safety device including a computing device and a first data interface, wherein:
the safety device is configured to:
receive the first data about the driving status from the first data source via the first data interface;
receive the second data about the driving status from the second data source; and
output pieces of information about the driving status to a driver using an information output device and based on the first and second data received, respectively, from the first data source and the second data source; and
an energy supply source for the safety device is an energy storage unit that is independent of an electrical system of the vehicle.

15. A method for operating a vehicle, the vehicle (a) being configured to be operated at least intermittently in an automated driving mode in which the vehicle drives in an automated manner, and (b) including (1) a first data source which is configured as a human machine interface that is configured to use a first information output device to output to a driver of the vehicle first data about a driving status indicating whether the driving status is that the vehicle is being driven in the automated manner and (2) a second data source which is different from the first data source and configured to output second data about the driving status, the method comprising the following steps:
receiving the first data about the driving status originating from the first data source;
receiving the second data about the driving status originating from the second data source; and
outputting pieces of information about the driving status to the driver using a second information output device and based on the first and second data about the driving status received, respectively, from the first data source and the second data source.

16. The method as recited in claim 15, further comprising the following step:
providing in the vehicle a safety device that (a) includes a computing device and a first data interface, and (b) is configured to:
perform the reception of the first data about the driving status from the first data source via the first data interface;
perform the reception of the second data about the driving status from the second data source; and
perform the output of the pieces of information about the driving status to the driver.

17. The vehicle as recited in claim 11, wherein the second data source and the first data source are supplied with energy by different energy supply sources.

18. The vehicle as recited in claim 17, wherein the different energy supply sources are parts of different vehicle electrical system channels.

19. The vehicle as recited in claim 11, wherein the first data source is supplied with energy by a different energy supply source than (a) the safety device and (b) the second data source.

20. The vehicle as recited in claim 19, wherein the different energy supply sources are parts of different vehicle electrical system channels.

* * * * *